United States Patent [19]
Anderson et al.

[11] 3,897,070
[45] July 29, 1975

[54] BANBURY TYPE MIXER

[75] Inventors: Gerald E. Anderson, Kent; Paul R. Kennedy, Akron, both of Ohio

[73] Assignee: The Goodyear Tire & Rubber Company, Akron, Ohio

[22] Filed: May 17, 1974

[21] Appl. No.: 470,785

[52] U.S. Cl................ 277/1; 277/212 FB; 259/185; 259/DIG. 2
[51] Int. Cl............................................. F16j 15/16
[58] Field of Search................. 277/1, 212, 212 FB; 259/185, 192, DIG. 2

[56] References Cited
UNITED STATES PATENTS

| | | | |
|---|---|---|---|
| 1,498,986 | 6/1924 | Banbury | 259/DIG. 2 |
| 1,512,813 | 10/1924 | Banbury | 259/DIG. 2 |
| 2,305,265 | 12/1942 | Tourneau | 277/212 FB |
| 2,680,264 | 6/1954 | MacLeod | 259/DIG. 2 |
| 3,596,916 | 8/1971 | Gottschald | 277/212 FB |
| 3,683,421 | 8/1972 | Martinie | 277/212 FB |

FOREIGN PATENTS OR APPLICATIONS
1,057,520  2/1967  United Kingdom..................... 277/1

Primary Examiner—Robert I. Smith
Attorney, Agent, or Firm—F. W. Brunner; R. S. Washburn

[57] ABSTRACT

Service time availability is increased and maintenance down time is reduced in a Banbury type mixer by providing a boot of highly flexible, high temperature and age resistant elastomer dust tightly connected to enclose the ram-weight socket.

The foregoing abstract is not to be taken as limiting the invention of this application, and in order to understand the full nature and extent of the technical disclosure of this application, reference must be made to the accompanying drawing and the following detailed description.

12 Claims, 2 Drawing Figures

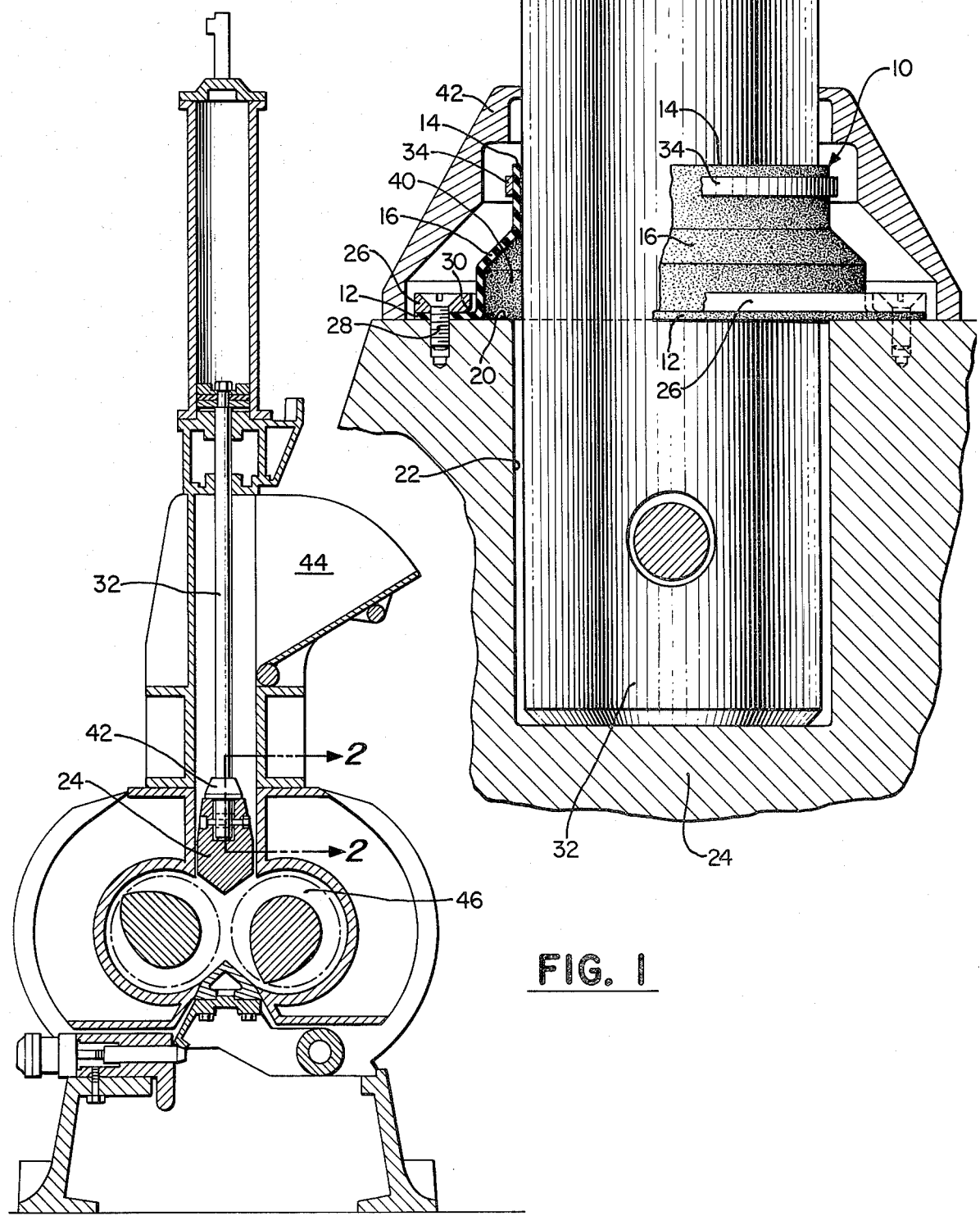

BANBURY TYPE MIXER

This invention relates to Banbury mixers and particularly to improvement of the Banbury apparatus and to methods for maintaining productive operations without interruption thereof.

Banbury mixers are too well known to persons skilled in the art to require further description here. It is well known that the successful operation of a Banbury mixer requires a ram weight which is movable toward and away from the mixing rotors to move batch ingredients toward the rotors. It is also well known that such ram weights must be free to wobble in order to obtain the most efficient results.

The mixing chamber and/or the rotors of a conventional Banbury are customarily cooled by water or like fluid circulating in passages within the rotors and/or water jackets applied to the walls of the chambers.

A known difficulty of long standing has plagued users of Banbury mixers. The ram-weight, which is connected to the ram, which is the piston rod of a cylinder operable to raise and to lower the ram-weight, is conventionally connected to the weight so as to permit the weight to move or wobble in response to forces generated as the mix is moved about within the mixing chamber by the meshing Banbury rotors. The usual construction provided is that of a generally cylindrical socket which receives the end of the piston rod or ram therein. To produce a downward force additional to the weight, the piston rod engages the bottom or floor of the socket. For lifting the weight, a pin fixed transversely of the socket passes freely through a transverse and vertically elongated slot in the ram. The piston rod is fitted loosely in the socket, there being approximately one-eighth inch difference in diameters. The clearance between the pin and slot are similar such that the weight is free to wobble as required. Conventionally, a rigid dust cover surrounds the rod and rests on the top of the weight so as to be free to move relatively of the rod and of the weight as the latter wobbles. The arrangement has long permitted vagrant materials of the mixture being processed and in particular dry powder ingredients thereof such as carbon black to enter the socket surrounding the piston rod. The necessary wobbling action of the weight tends to pack such material more and more tightly into the socket until the wobbling motion is either partially or totally inhibited whereupon the Banbury must be taken out of service to restore its full efficiency. Numerous attempts to remedy the situation have been made but none have had sufficient merit to go into commercial use.

As a result of the packing of material into the socket as described, shutdown for clearing the packed material from the socket must be made often, in some cases as often as once every eight hours at a considerable cost in lost productive mixing time. The shutdown frequently requires that the weight and ram must be taken apart and compacted ingredients such as carbon black must be cut or chiseled out of the socket.

Hence, a principal object of the present invention is to alleviate the aforedescribed problem and thereby to increase the efficiency and economy of the operation of a Banbury mixer.

Broadly and briefly stated, the present invention comprises the provision of specific means for and a method of excluding from the socket in the ram-weight of a Banbury mixer ingredients of the compounds being processed, especially dry powder material such as carbon black, and to maintain within the socket a supply of effective lubricant.

The foregoing object as well as further objects and advantages which will become apparent are accomplished in accordance with the invention by excluding the dry powder ingredients with a boot closing the socket to retain lubricant therein. The annular boot must have a highly flexible heat resistant wall extending circumferentially around the ram and be secured dust-tightly both to the ram and to the weight outwardly of the socket. The boot comprises a flange portion sealingly secured to a surface of the weight surrounding the socket and a wall portion sealingly secured to the ram. A flexible intermediate portion joins the flange portion integrally to the cylindrical portion and is formed of a heat resistant, highly flexible, elastomeric material.

To acquaint persons skilled in the art with the principles of the invention, the following description which includes the attached drawings, sets forth a preferred embodiment representing the present best mode of practice thereof, by way of illustration and not to be considered as limiting the invention, the scope of which is pointed out in the appended claims.

In the drawings:

FIG. 1 is a view in vertical section elevation of a Banbury mixer; and

FIG. 2 is an enlarged section view taken as indicated by the line 2—2 in FIG. 1 illustrating the application of the invention in such Banbury mixer.

As used in the present specification, a machine element commonly referred to as a boot will be understood to mean a readily flexible sleeve, fixedly secured at each of its ends respectively to and extending across a space between the members of a pair thereof which can move relatively of one another, to prevent the entry of foreign material between such members and/or the loss of lubricant from between the members. The distinction between the boot as the term is used herein, and the machine element commonly known as seal, is that a seal is understood to accommodate continuous movement of one member relative to the other of the pair such that a seal can be fixedly secured to only one such member but not to both such members.

Boots, as above defined, are well known and have long been commonly used on many diverse types of machinery; however, heretofore, insofar as we are aware, no satisfactory application of any flexible sleeve or boot has been made in a mixer of the Banbury type. The present invention arises at least in part from a recognition that temperatures considerably in excess of those temperatures tolerated by machine elements of cured elastomeric material or the mixing of rubber compounds can exist in the region immediately surrounding the connection between the ram and the ram-weight in a Banbury mixer. As has been mentioned above, the mixing chamber and the rotors tend to be heated by the energy input to the material being mixed which heat is removed by the water cooling passages and jackets. On the other hand, insofar as we are aware, no successful attempts have been made to cool either the ram-weight or the ram itself and it appears that any such attempt would encounter serious mechanical difficulty in view of the desirable wobble of the ram-weight.

In a particularly preferred embodiment of the present invention, as illustrated in FIGS. 1 and 2, the boot 10 is provided as a molded cured unitary boot comprising an annular flange 12, a cylindrical wall 14, and an intermediate portion 16 connected integrally to the flange and to the wall, and flaring outwardly from the wall toward the flange. Preferably, the boot is molded of highly flexible, long flex life, heat, oil, and age-resistant elastic polymeric material, which is resistant to crack propagation or growth and has good life at environmental temperatures up to at least about 300°F. and preferably to about 400°F.

The flange 12 of the boot is disposed in firm, dust-tight relation to an annular surface 20 surrounding the socket 22 in the ram-weight 24 and is there secured by a conventional rigid metal or equivalent clamp ring 26 attached to the weight by a plurality of cap screws 28. The annular surface 20 on the weight should be, or be made, smooth, and the clamp ring should be provided with a radius 30 sufficient to prevent overstress in the flange from the pressure thereon of the clamp ring 26.

The cylindrical wall 14 is molded to have an internal diameter snugly to fit the ram 32 at least about one-half ram diameter distant from the annular surface outwardly of the weight. The cylindrical wall is secured by a strap 34, preferably of high tensile, highly elastically yieldable organic polymeric material, such as, for example, a polyvinylchloride, nylon, polyester, or a polyolefin having a sufficiently high coefficient of temperature expansion to prevent excessive compression stress in the wall 14 between the ram 32 and the strap 34. Conventional metal strap clamps of the type used to connect hose are in general too rigid and not satisfactory in the practice of the present invention.

The flange-to-weight and wall-to-ram interfaces are made tight to prevent entry of ingredients, especially dust and powders, such as carbon black, as well as to prevent escape of lubriant from within the socket.

The intermediate portion 16 extending between the cylindrical wall and the flange must have a contour length in any plane containing the ram axis which length is greater than the straight line distance between the wall portion and the flange portion in such plane so that the intermediate portion is never subjected to axial tension during the wobble movement of the weight relative to the ram.

A reservoir 40 for lubricant in the socket surrounding the ram is provided by flaring the intermediate portion outwardly from its juncture with the wall portion to its juncture with the flange portion. A preferred form of such contour length is illustrated in FIG. 2, and is free of sharp or reentrant edges, grooves, or indentations, into which dust, such as carbon black, can pack. Other configurations of the contour length can be used so long as the boot is not subjected to axial tension during the wobble movement of the weight.

The customary rigid dust collar 42 usually furnished is altered as by remachining the interior thereof sufficiently to provide annular clearance around the full axial length of the boot and will then protect the boot from bruises or abrasions by vagrant ingredients falling from the loading chute 44 and/or thrown from the mixing chamber 46.

Further, and in accordance with the invention, the boot 10 is formed by molding and curling in a mold (not shown) having approximately the configuration of the cured boot 10 illustrated in FIG. 2. It is presently believed disadvantageous to include in a construction of the boot 10 any fabric, cord, or like structural reinforcing elements. Various compositions can be used for the boot according to the invention. Representative of such compositions are such elastomers as butadiene/acrylonitrile copolymers, copolymers of ethylene propylene and a non-conjugated diene, polypropylene oxide and copolymers of propylene oxide with monomers selected from unsaturated monoepoxides containing three to about ten carbon atoms, such as 1,7-octadiene monoepoxide, 1,6-heptadiene monoepoxide, 1,4-pentadiene monoepoxide, 1,5-hexadiene monoepoxide, 1,3-butadiene monoepoxide, of which haloglycidyl ether is preferred. In the practice of the invention, polypropylene oxide and copolymers of propylene oxide with haloglycidyl ether are preferred. Such polymers can be prepared according to methods set forth in U.S. Pat. No. 3,135,705, as well as other methods known to those in the rubber polymer arts.

The compositions preferred in the practice of the present invention can be placed on a rubber mill and compounded with the normal rubber compounding ingredients, such as curing agents, fillers, antioxidants, and the like, and cured to yield elastomers, in particular, a boot moldable as indicated in FIG. 2. Such ingredients can include, for example, sulfur, mercaptobenzothiazole, benzothiazyl-sulfide, tetramethylthiuram monosulfide, zinc oxide stearic acid. The fillers can be, for example, carbon black, silica, alumina, calcium carbonate, diatomaceous earth, and the like. The antioxidants can be, for example, nickel dibutyldithiocarbamate, phenyl-a-naphthylamine, phenyl-b-naphthylamine, 2,6-ditertiary butyl paracresol, and the like. The sulfur cured propylene oxide polymers or copolymers used in the preferred boot according to this invention are generally rubbery in nature and characterized by having a glass transition temperature in the range of from −60°C. to about −75°C. and more preferably in the range of about −65° to −70°C. as determined by ASTM test No. D746, or the Scott Brittle Point test. The rubbery sulfur cured polymer or copolymers are generally further characterized by having an ultimate tensile strength as measured from a one-tenth inch dumbbell sample on an Instron tensile tester at a crosshead speed of about 5 inches per minute by normal rubber testing procedures of in the range of about 1,500 pounds per square inch to about 3,500 pounds per square inch, with a corresponding ultimate elongation at about 25°C. of in the range of about 200 to about 1,100 percent. They generally have a molecular weight of at least about 500,000 and typically in the range of about 750,000 to 10 million.

The rubbery polymers or copolymers of propylene oxide used in the mixture of this invention are generally prepared by copolymerizing the porpylene oxide with at least one of the comonomers under suitable and generally recognized polymerization conditions.

According to the invention, the time available for service of a Banbury type mixer for processing rubbery compounds is markedly improved and the need for frequent cleaning of the connection between the ram-weight and the ram is conspicuously reduced by excluding dry powders from such socket by the use of an annular boot therearound having a highly flexible heat resistant wall extending circumferentially around the ram and axially of the ram outwardly of the socket. Use of such boot furthermore provides such socket and its connection with such ram with a suitable fill of lubricant, which lubricant, in accordance with the invention, can retain its lubricating properties over extended periods of time.

In addition, it is advantageous to dispose a cylindrical wall portion of the boot at least one-half ram diameter distant from the ram-weight and to provide space within such boot in which to accommodate a supply of lubricant in communication with the socket. As has been mentioned, the boot is secured to the ram in dust-tight relation by using a yieldable strap of polymerized synthetic resin rather than a rigid non-yielding clamping means.

While certain representative embodiments and details have been shown for the purpose of illustrating the invention, it will be apparent to those skilled in the art that various changes and modifications may be made therein without departing from the spirit or scope of the invention.

What is claimed is:

1. The method of improving service time availability of a Banbury-type mixer for processing rubber compounds and the like by mixing dry powders thereinto, which mixer comprises a ram-weight ram and a ram-weight having a socket receiving an end of said ram, said ram-weight being connected to said ram by means providing limited relative movement of the weight with respect to the ram, said method comprising filling said socket about said ram with a suitable fill of lubricant, and excluding said dry powders by closing said socket to retain said lubricant therein with an annular boot having a highly flexible heat-resistant wall extending circumferentially around said ram and axially of said ram outwardly of said socket.

2. The method as claimed in claim 1, including securing said boot to said ram in dust-tight relation by means of an elastically yieldable strap of synthetic organic polymeric material.

3. The method as claimed in claim 1, further comprising securing said boot to said weight in dust-tight relation with a metal ring.

4. The method as claimed in claim 1, including protecting said boot against damage by vagrant ingredients by a rigid dust collar disposed in annularly spaced relation from and about said boot, said collar being free to move relatively of said weight and of said ram.

5. The method as claimed in claim 1, further comprising spacing said boot radially outwardly of said ram to provide within said boot an annular space accommodating a supply of lubricant communicating with said socket.

6. In a rubber compounding apparatus of the Banbury type including a ram-weight having a ram receiving socket and a ram received in said socket, said weight being connected in said socket to said ram for limited movements of the ram-weight vertically, horizontally, and angularly relatively of the ram, the improvement comprising a boot including a flange portion sealingly secured to a surface of said weight annularly about said socket, a cylindrical wall portion sealingly secured to said ram at a location spaced axially outwardly from said surface along said ram, and an intermediate portion joined integrally to said flange portion and to said cylindrical portion, at least said intermediate portion of said boot being of heat resistant, high flex life, elastomeric material.

7. In an apparatus as claimed in claim 6, a rigid ring secured to said surface with said flange portion clamped sealingly between said ring and said surface, and a strap snugly surrounding said cylindrical portion to secure the latter dust-tightly to said ram.

8. In an apparatus as claimed in claim 7, said strap comprising a high tensile organic polymeric material selected from the group comprising nylon, polyvinylchloride, polyester, and polyolefin.

9. In an apparatus as claimed in claim 6, said elastomeric material being of a compounded cured rubbery material selected from the group consisting of butadiene acrylonitrile copolymers, terpolymers of ethylene propylene and a non-conjugated diene, polypropylene oxide and copolymers of propylene oxide with monomers selected from unsaturated monoepoxides.

10. In an apparatus as claimed in claim 9, said elastomer consisting essentially of a rubbery propylene oxide polymer having a molecular weight of at least about 500,000.

11. In an apparatus as claimed in claim 6, said intermediate portion having a contour length in any plane containing the ram axis which length is greater than the straight line distance between said wall portion and said flange portion in such plane such that said intermediate portion is not subjected to axial tension by relative movement between said weight and ram.

12. In an apparatus as claimed in claim 11, said intermediate portion being flared outwardly of said wall portion to provide between said boot and said ram a reservoir for lubricant in communication with said socket.

* * * * *